United States Patent
Milne et al.

(10) Patent No.: US 9,766,116 B2
(45) Date of Patent: Sep. 19, 2017

(54) PEDIATRIC BOARD

(71) Applicants: Samuel Ethan Milne, Goderich (CA); William Kenneth Milne, Goderich (CA)

(72) Inventors: Samuel Ethan Milne, Goderich (CA); William Kenneth Milne, Goderich (CA)

(*) Notice: Subject to any disclaimer, the term of this patent is extended or adjusted under 35 U.S.C. 154(b) by 161 days.

(21) Appl. No.: 14/872,297

(22) Filed: Oct. 1, 2015

(65) Prior Publication Data

US 2016/0097673 A1    Apr. 7, 2016

Related U.S. Application Data

(60) Provisional application No. 62/059,237, filed on Oct. 3, 2014, provisional application No. 62/140,660, filed on Mar. 31, 2015.

(51) Int. Cl.
*G01G 19/00* (2006.01)
*G01G 19/44* (2006.01)

(52) U.S. Cl.
CPC .................................. *G01G 19/44* (2013.01)

(58) Field of Classification Search
CPC ...... G01G 19/44; G01G 19/445; G01G 19/50; G01G 19/52; G01G 23/3721; A61G 7/0527
See application file for complete search history.

(56) References Cited

U.S. PATENT DOCUMENTS 4,363,368 A * 12/1982 Paddon ................ G01G 19/445
                                                   177/144
4,713,888 A * 12/1987 Broselow ............. A61B 5/1072
                                                    33/512

(Continued)

FOREIGN PATENT DOCUMENTS

| CN | 103063283 | 4/2013 |
| CN | 203122360 | 8/2013 |

(Continued)

OTHER PUBLICATIONS

Milne SE, et al. Pediatric Electronic Board (Ped-E-Board). Poster presentation at ACEP, Oct. 1, 2014.

*Primary Examiner* — Natalie Huls
(74) *Attorney, Agent, or Firm* — Brunet & Co. Ltd.; Robert A. H. Brunet

(57) ABSTRACT

An apparatus includes a backboard configured to support an immobilized, supine individual during transportation of the individual and a weighing device associated with the backboard and moveable with the backboard during the transportation of the individual. The weighing device configured to determine weight of the individual on the backboard. A light on the backboard is in electronic communication with the weighing device, and the light is associated with a predetermined weight range. The light is configured to be illuminated only when the weight determined by the weighing device is within the predetermined weight range. The apparatus permits determining the dosage of a medicament to be administered to an individual, especially a pediatric patient, when the individual is on the backboard because the dosage of the medicament is correlated to the weight of the individual.

20 Claims, 5 Drawing Sheets

(56) References Cited

U.S. PATENT DOCUMENTS

| | | | | |
|---|---|---|---|---|
| 4,823,469 A | * | 4/1989 | Broselow | A61B 5/107 |
| | | | | 33/512 |
| 5,010,656 A | * | 4/1991 | Broselow | A61B 5/107 |
| | | | | 33/512 |
| 5,494,051 A | * | 2/1996 | Schneider, Sr. | A61G 1/00 |
| | | | | 128/870 |
| 6,093,895 A | * | 7/2000 | Niosi | G01G 19/445 |
| | | | | 177/136 |
| 6,132,416 A | | 10/2000 | Broselow | |
| 7,199,311 B1 | | 4/2007 | Buckner, Jr. et al. | |
| 7,281,285 B2 | | 10/2007 | Zucker et al. | |
| 8,504,323 B2 | | 8/2013 | Coradi | |
| 8,590,168 B2 | | 11/2013 | Abdel-Rahman | |
| 8,822,847 B2 | * | 9/2014 | Vidal | G01G 19/414 |
| | | | | 128/923 |
| 8,892,203 B2 | | 11/2014 | Heinrichs et al. | |
| 9,536,448 B1 | * | 1/2017 | Kordecki, Jr. | G09B 19/00 |
| 2012/0111645 A1 | * | 5/2012 | Lindner | G01G 19/50 |
| | | | | 177/177 |
| 2012/0259378 A1 | * | 10/2012 | Heinrichs | G01G 19/445 |
| | | | | 607/6 |

FOREIGN PATENT DOCUMENTS

| | | |
|---|---|---|
| CN | 203132668 | 8/2013 |
| CN | 203132671 | 8/2013 |
| CN | 203385472 | 1/2014 |

\* cited by examiner

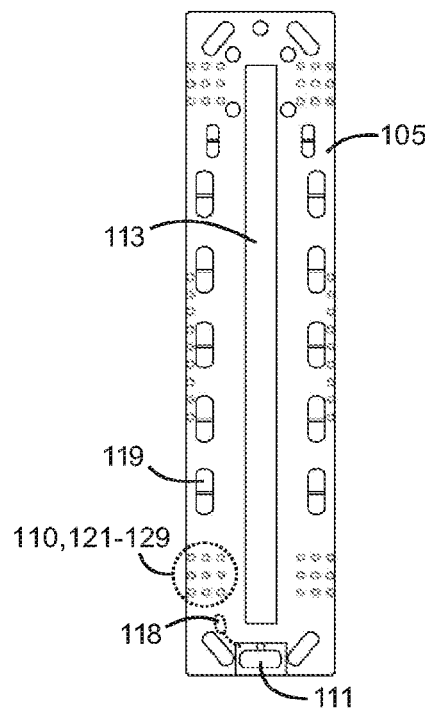
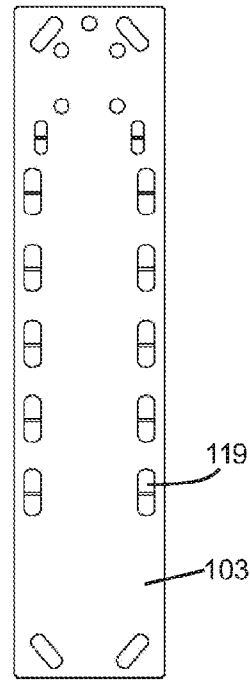
Fig. 2D
Fig. 2E
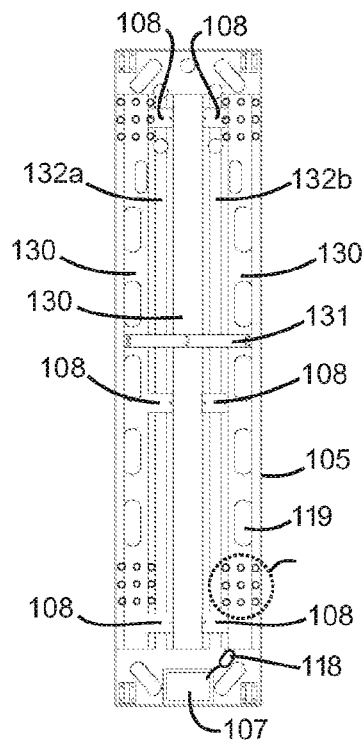
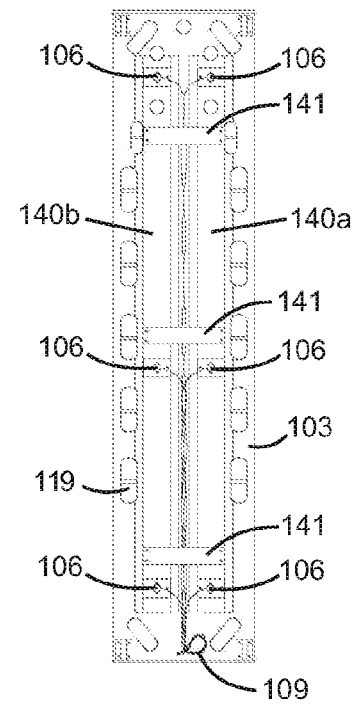
Fig. 2F
Fig. 2G

PEDIATRIC BOARD

CROSS-REFERENCE TO RELATED APPLICATIONS

This application claims the benefit of U.S. Provisional Patent application Ser. No. 62/059,237 filed Oct. 3, 2014 and of U.S. Provisional Patent application Ser. No. 62/140,660 filed Mar. 31, 2015, the entire contents of both of which are herein incorporated by reference.

FIELD

This application relates to backboards, more particularly to medical backboards especially for use in pediatric care.

BACKGROUND

Rapidly and accurately determining the weight of a child can be of critical importance during pediatric emergencies and resuscitations. Emergency physicians use the weight of a child to select the medicament dosages, defibrillation energy (joules) and endotracheal (ET) tube size. In many instances, the patient is secured to an immobilization or spine board, which introduces challenges when trying to determine the patient's weight.

One solution to determining the weight of a patient, which has been used for decades and is prevalent in practice, is the Broselow Pediatric Emergency Tape (Broselow Tape or BT). The BT is secured to a spine board to provide a reference for determining weight based on patient height or length. U.S. Pat. No. 6,132,416 issued Oct. 17, 2000, the contents of which are herein incorporated by reference, details the method of determining proper medication dosage by correlating a plurality of dosages of a plurality of medications to respective weight-related values and assigning a color to each of the respective weight-related values. Weight-related values are correlated to the height of the patient. However, recent studies have shown that the BT practice is no longer entirely accurate as BT tends to now underestimate the weight of children. This has arisen from the worldwide childhood obesity epidemic.

Recently, emergency response backboards with integrated weigh scales have been developed to determine weight of a patient directly on the backboard, for example, as described in U.S. Pat. No. 8,892,203 issued Nov. 18, 2014, the contents of which are herein incorporated by reference. While useful for directly determining the weight of a patient, a separate problem arises as certain emergency procedures do not rely on weight of the patient, for example, the size of endotracheal tubes (ET) used in intubation.

There remains a need for a system that can provide emergency responders with a highly perceptible and an accurate patient weight, preferably with all potentially necessary patient information, particularly a pediatric patient, while the patient is on a backboard.

SUMMARY

There is provided an apparatus comprising: a backboard configured to support an immobilized, supine individual during transportation of the individual; a weighing device associated with the backboard and moveable with the backboard during the transportation of the individual, the weighing device configured to determine weight of the individual on the backboard; and, a light on the backboard, the light in electronic communication with the weighing device, the light associated with a predetermined weight range, the light configured to be illuminated only when the weight determined by the weighing device is within the predetermined weight range.

There is further provided a method for determining a dosage of a medicament for an individual on a backboard, the method comprising: weighing the individual on the backboard with a weighing device associated with the backboard to determine a weight of the individual; and, illuminating a light associated with the weight of the individual, the weight of the individual correlated to a dosage of a medicament.

There is further provided a system for selecting a dosage of a medicament for an individual on a backboard, the system comprising: an apparatus of the present invention; and, a dosage form of a medicament containing a dosage of the medicament appropriate for an individual having a weight in the weight range being indicated by the illuminated light.

The apparatus provides a fast and easy way of determining the dosage of a medicament to be administered to an individual, especially a pediatric patient, when the individual is on the backboard. Because the dosage of the medicament is correlated to the weight of the individual, and the weight of the individual is correlated to the light being illuminated, medical personnel are provided easily perceived visual clues for selecting the correct dosage of medicament for the individual on the backboard in a given emergency situation. It is of especial importance for emergency responders to be able to very quickly and reliably determine the correct dosage for a given individual, and then to be able to select a correct pre-supplied dosage form containing the medicament for immediate administration to the individual.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2D depicts an outside view of a top patient support portion of the apparatus of FIG. 2A;

FIG. 2E depicts an outside view of a bottom base portion of the apparatus of FIG. 2A;

FIG. 2F depicts an inside view of a top patient support portion of the apparatus of FIG. 2A;

FIG. 2G depicts an inside view of a bottom base portion of the apparatus of FIG. 2A;

DETAILED DESCRIPTION

Figure 1:
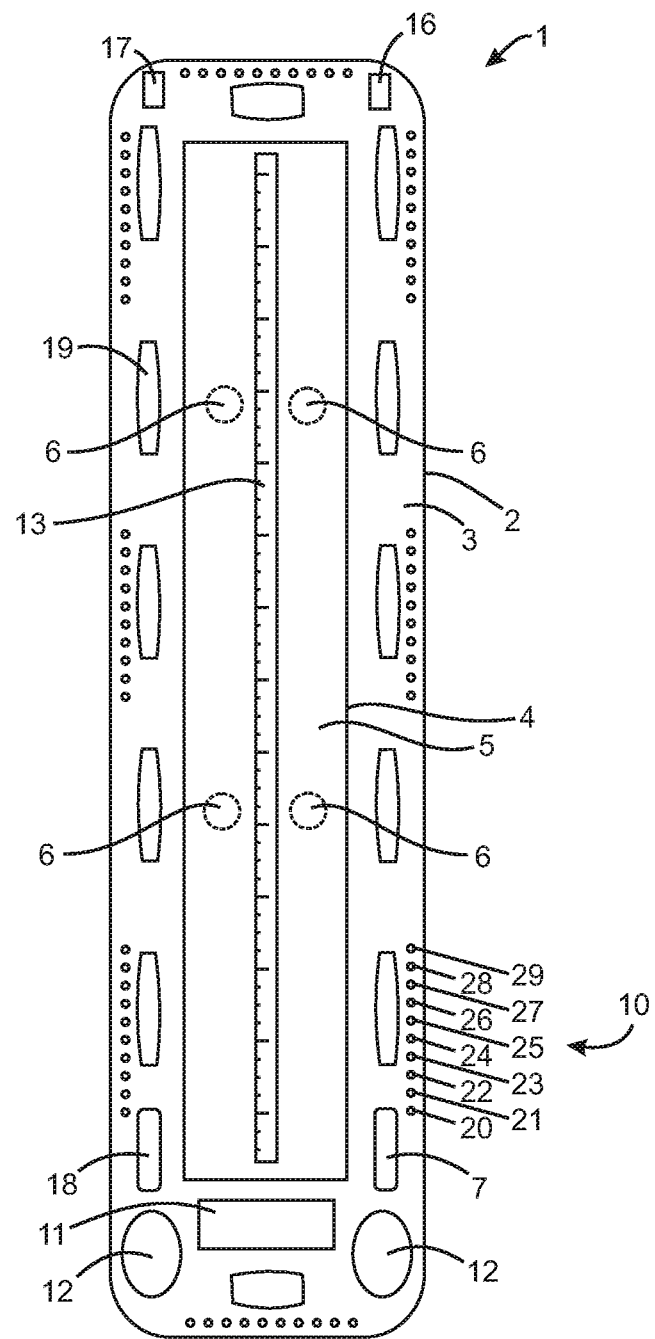
FIG. 1 depicts an embodiment of an apparatus in accordance with the present invention.
Figures 2A, 2B:
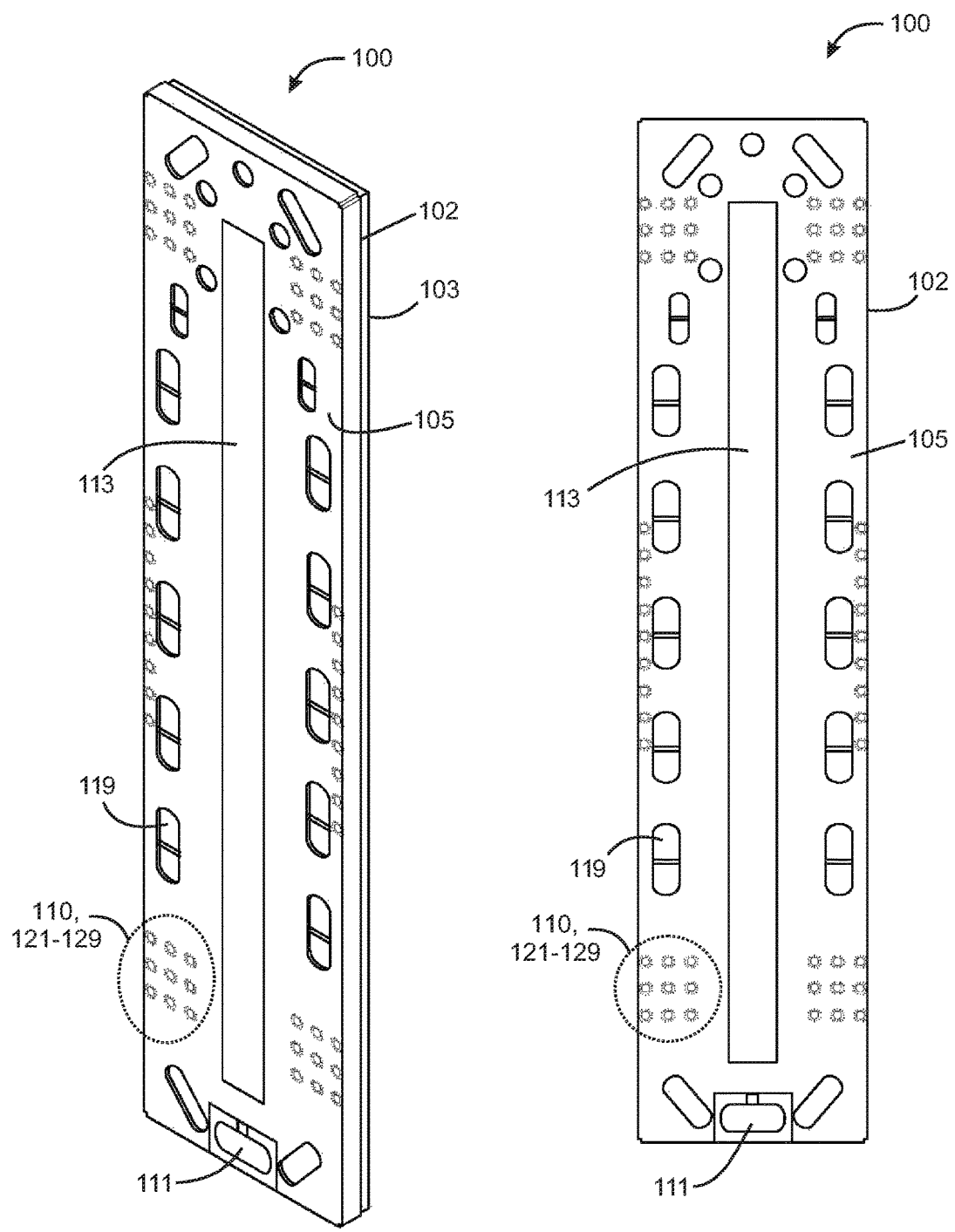
FIG. 2A depicts a perspective view of another embodiment of an apparatus in accordance with the present invention.
FIG. 2B depicts a top view of the apparatus of FIG. 2A.
Figure 2C:
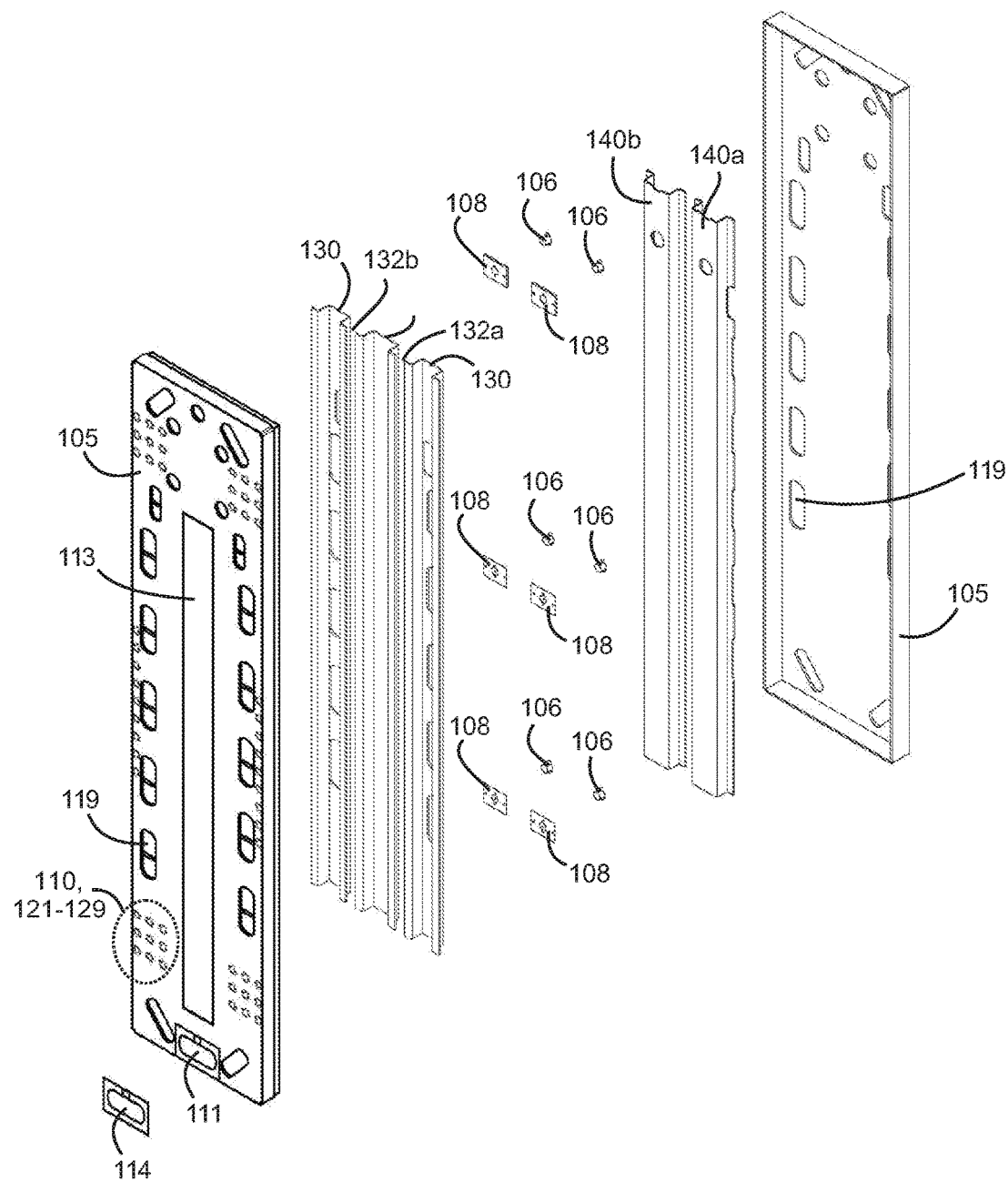
FIG. 2C depicts an exploded view of the apparatus of FIG. 2A.

In the apparatus, a weighing device is associated with a backboard and moveable with the backboard during the transportation of an individual on the backboard. The weighing device is configured to determine weight of the individual on the backboard and a light on the backboard is in electronic communication with the weighing device such that the light becomes illuminated when the weight determined by the weighing device is within a predetermined weight range. Thus, illumination of the light on the backboard permits medical personnel (e.g. an emergency responder) to determine a weight range within which lies the weight of the individual on the backboard. By drawing a correspondence between the light and the weight range, and correlating the weight range to a dosage of medicament, the medical personnel can quickly choose an appropriate treatment response for the individual on the backboard.

In one aspect, the light may be a colored light. The color may be inherent within the light emission itself or a colored transparent or translucent enclosure (e.g. glass, plastic and the like) around the light source may impart the color. Any type of light may be suitable, for example, an incandescent light, a fluorescent light or a light emitting diode (LED). A plurality of lights may be utilized. The plurality of lights may comprise a single type of light or a collection of two or more different types of lights. One or more of the plurality of lights may correspond to a different predetermined weight range. One or more of the predetermined weight ranges may correspond to two or more of the lights.

The light may be located anywhere on the backboard where it is sufficiently visible to medical personnel to be able to discern whether the light is illuminated. In one embodiment, locating the light proximate a periphery of the backboard helps increase visibility of the light. Careful placement of the light would permit medical personnel to see the light from any or almost any vantage point. Providing a plurality of lights, each light corresponding to a different predetermined weight range, permits selection of the correct dosage over a larger number of weight ranges. The lights in the plurality of lights may be marked appropriately so that the medical personnel can rapidly and accurately determine the weight of the individual on the backboard. The plurality of lights may be provided as a plurality of groups of lights, each group having a plurality of individual lights. Each of the groups of lights may contain lights marked in the same way as in other groups of lights to provide redundancy in the case of failure of a light, and/or to provide more opportunity for being able to observe the lights.

The apparatus may be accompanied by a dosage form of a medicament containing a dosage of the medicament appropriate for an individual having a weight in the weight range being indicated by the illuminated light. Where a plurality of lights are utilized to signify a plurality of different weight ranges, a plurality of dosage forms each containing an appropriate dosage of the medicament for a given weight range may accompany the apparatus. The dosage forms and lights may be appropriately marked to provide a correspondence between individual lights and individual dosage forms, thereby providing a correspondence between the dosage form with the correct dosage and the weight of the individual on the backboard.

Dosage forms may include any form of the medicament that may be administered to the individual. For example, dosage forms for oral, inhalational, parenteral or topical administration may be employed. Due to the nature of emergency situations, the dosage form is preferably injectable, for example by intradermal (ID), intramuscular (IM), intraosseous (IO), intraperitoneal (IP), intravenous (IV), subcutaneous (SC) or intrathecal (IT) injection. Some dosage forms may require administration devices to be administrable to an individual. Administration devices may include syringes, inhalers, patches and the like. The dosage forms may be already contained within the administration device for ease of use. The dosage forms may be packaged in a packaging. Packaging protects the dosage form from damage, maintains sterility and provides a convenient place to include markings and other information to identify the medicament, the dosage of the medicament and any other information that may be useful to medical personnel.

One convenient method of providing a visual correspondence between the lights and the dosage form is the use of color. The lights may be color-coded to correspond to a first color scale. The first color scale may be any suitable color sequence that may be utilized to correspond to weight ranges of the individual. The dosage forms may be color-coded on the same color scale so that the dosages of the medicament in the dosage forms correspond to the same weight ranges. For example a blue light would correspond to a certain weight range and a blue marking on the dosage form or its packaging would indicate that the dosage of medicament is for an individual having a weight in that certain weight range. Since the dosage of the medicament is correlated to the weight of the individual and the color of the lights corresponds to the weight of the individual, the color of the lights becomes a quick visual reference to the appropriate dosage of the medicament. Using the same color coding on the dosage forms or packages containing the medicament permits rapid and accurate selection of the correct dosage form or package for any individual. Providing a plurality of lights, each light corresponding to a different predetermined weight range, permits selection of the correct dosage over a larger number of weight ranges.

Any suitable color scale may be employed. However, currently used medical backboards utilizing a Broselow Tape are already accompanied by color-coded packages of emergency equipment, where the color code is based on the Broselow color scale. Therefore, in a preferred embodiment, the first color scale may be the Broselow color scale or a color scale based on the Brosleow scale. However, the selection of the correct package with the appropriate dosage of medicament is based on the actual weight of the individual and communicated through the light, instead of being based on the height of the individual. Thus, a more accurate selection may be made by medical personnel. Further, by color-coding dosage forms or packages containing dosages of the medicament, the medical personnel are provided with an immediate visual confirmation of the appropriate dosage to select when a light of the same color is illuminated.

The weighing device is configured to determine weight of the individual on the backboard. The weighing device may be a separate weigh scale on which the backboard rests, or may comprise weighing elements that are integrated into the backboard. Preferably, the weighing device is integrated into the backboard. The weighing device preferably comprises one or more load cells strategically located in the backboard to correctly measure the weight of the individual on the backboard. Preferably more than one load cell is employed and the load cells distributed on a base of the backboard. A load support may be situated on top of the load cells to both help evenly distribute the weight of the individual and to help protect the load cells and other electronics. The load support may be sealed to the base of the backboard, for example with a seal around the perimeter of the load support, which further helps protect the load cells and other electronics from contamination. The seal is preferably flexible to permit the load support to move responsive to movement of the individual to ensure accurate measurement of weight by the load cells.

An electronic signal produced by the weighing device is transmitted to an output device to provide an indication of the weight of the individual. In the present invention, the output device comprises the light. When the weight of the individual is within the predetermined range, the electronic signal from the weighing device switches the light on. When the weight measured by the weighing device is no longer within the predetermined range, the light is switched off. The electronic signal may be transmitted from the weighing device to the light through wires or wirelessly.

One or more additional output devices may be included with the apparatus. The backboard may further comprise a display configured to numerically display the weight of the individual. Such a display may provide a more exact display of the weight, and may provide confirmation that the weight range indicated by the light is correct. The display may be analog or digital, for example, liquid crystal displays (LCD), LED displays, needle displays and the like. The display may be audible rather than or in addition to visual with the weight information being transmitted through speakers, earbuds or the like. A wireless transmitter (e.g. Bluetooth™, WiFi) or a memory device (e.g. a USB stick) may also receive signals from the weighing device. Data may be stored on the memory device and/or weight information and/or other information may be communicated to a remote location (e.g. a hospital) by the wireless transmitter. Other information may include, for example, distance from an emergency department (e.g. GPS information).

To control electronic communication between the weighing device and the output device or output devices, logic control circuits may be employed if desired. The logic control circuits may be part of a microprocessor, which may be part of a computer. If desired, the logic circuits may be provided with an input interface so that settings and other parameters may be altered by an operator.

The backboard may be of any suitable style and made of any suitable material for use in transporting a supine, immobilized individual. The backboard may be designed for adults or children. In a preferred embodiment, the backboard is a spine board designed for use in association with pediatric resuscitation of critically ill or injured children. The backboard is preferably constructed of a rigid, durable material, for example plastic, wood, metal (e.g. stainless steel, aluminum) and the like. The backboard is desirably compatible with one or more medical imaging techniques, for example X-rays, CT scans, magnetic resonance imaging (MRI) or the like. The size of the backboard is preferably appropriate for its use. The backboard preferably has smooth edges and rounded corners to reduce the likelihood of injury, and is preferably water-resistant to protect electronic components and to permit easy cleaning. One or more handles or handholds may be included for ease of lifting and handling. One or more anchoring locations for a variety of straps or other restraints may be provided to safely immobilize the individual on the backboard.

The apparatus may further comprise a height measuring device configured to measure height of the individual. The height measuring device may be utilized as a back-up to the light in providing an estimate of the individual's weight in accordance with the Broselow scale. The height measuring device is preferably on the backboard. Any suitable measuring device may be used, for example mechanical devices (e.g. a tape or ruler) or optoelectronic devices (e.g. a laser-based measuring device). In one embodiment, a tape, for example a Broselow Tape, is mounted on the backboard.

Some types of medical equipment used in conjunction with the backboard have parameters that are correlated to the individual's height rather than weight. For example, the correct size of an endotracheal tube (ET) for a particular individual is correlated to height, not weight. Therefore, the presence of a height measuring device is useful for medical personnel aside from being a back-up for weight estimation.

The height measuring device may also be color-coded to correspond to a second color scale. The second color scale may be utilized for determining the correct height-correlated equipment to select for a procedure. For example, the second color scale may be correlated to a size of endotracheal tube for the individual, the size of endotracheal tube correlated to the height of the individual. Any suitable color scale may be employed. However, currently used medical backboards utilizing a Broselow Tape are already accompanied by color-coded packages of emergency equipment, where the color code is based on the Broselow color scale. Therefore, in a preferred embodiment, the second color scale may be the Broselow color scale or a color scale based on the Broseleow scale.

As discussed previously, current practice with medical backboards involves utilizing color-coded packages of emergency equipment, where the color code is based on the Broselow color scale. These packages contain all of the typically used emergency equipment (e.g. defibrillators, endotracheal tubes and the like) and medicaments (e.g. atropine, dopamine, epinephrine, and the like). Each package is currently coded with a color corresponding to the Broselow color scale that correlates to particular parameters of the emergency equipment (e.g. defibrillation energy, ET tube size) and to particular dosages of all of the medicaments. Also as discussed previously, it is now known that the correlation between height and weight of children is no longer appropriate in many cases, therefore, the contents of one package are no longer completely appropriate for a given individual. Weight correlated parameters (e.g. defibrillation energy and medicament dosage) and height correlated parameters (e.g. ET tube size) are now disconnected in many cases.

An advantage of the present apparatus, method and system is the ability to correctly determine both the desired package for weight correlated parameters and the desired package for height correlated parameters while still using the existing Broselow color scale coded packages. For a given individual, medical personnel may need to open two different packages, one for the medicament and/or the defibrillator and another for the ET tube, but that is preferable to using an inappropriate, possibly life-threatening, medicament dosage, defibrillation energy or ET tube size. Therefore, the present invention advantageously may be seamlessly integrated into existing emergency procedures.

FIG. 1 depicts an embodiment of an apparatus 1 in accordance with the present invention. The apparatus 1 comprises a spine board 2 having a base portion 3 and a weigh scale 4 integrated into the spine board 2. The weigh scale 4 comprises a top plate 5 on which a patient would lie supine, and four load cells 6 evenly distributed on the base portion 3 between the base portion 3 and the top plate 5. The load cells 6 measure weight on the top plate 5 and the load cells 6 transmit electrical signals through wires to logic circuit board 7, which also acts as a wire connecting node. A logic circuit on the logic circuit board 7 synthesizes the signals from the load cells 6 to determine the weight on the top plate 5, and then sends appropriate signals through wires to a plurality of light banks 10 (only one labeled), visual display 11 and audio devices 12, where an appropriate indication of weight is displayed. The visual display 11 displays a numerical output of weight, whereas as the audio devices 12 provide a spoken indication of the weight.

The plurality of light banks 10 (e.g. eight) are the same and each comprise a plurality of colored lights 20-29 (e.g. ten, only one set labeled) located at a periphery of the base portion 3. Each of the colored lights 20-29 in the light bank 10 corresponds to a particular weight range, and when the load cells 6 measure a weight, the logic circuit sends a 'switch on' signal to the appropriate colored light that corresponds to the weight range within which the measured weight falls. If the weight is removed or changed, the illuminated colored light receives a signal from the logic circuit to switch off, and another colored light may receive a signal to switch on. The plurality of light banks 10 provide redundancy in the event a given light is broken, and also provides the ability for medical personnel to see lights from any vantage point.

The logic circuit board 7 is also in electronic communication with a wireless device 16 so that data collected from the load cells 6 may be transmitted to a remote location, such as a hospital. The wireless device 16 may also enable two-way communication between the remote location and the apparatus 1 to implement control functions from the remote location, if desired. A GPS transmitter 17 sends GPS signals through satellites so that the location of the apparatus 1 may be determined and location information may be transmitted to the remote location. A power supply 18 provides power to all of the electronic elements including the load cells 6, circuit board 7, light banks 10, visual display 11 and audio devices 12, wireless device 16 and GPS transmitter 17.

Persons of skill in the art will understand that, in order to enhance compatibility of the board with medical imaging techniques (e.g. X-ray), components of the board that are non-transparent to a technique, such as electronic components (e.g. circuit boards, wires, load cells, etc.), may be re-positioned, for example about the periphery of the board, so as not to interfere with patient images generated while a patient is strapped to the board.

A plurality of apertures 19 (e.g. ten, only one labeled) are distributed around the periphery of the base portion 3 to act as hand holds to permit carrying of the apparatus 1 and also to provide apertures through which straps may be secured to immobilize a patient on the spine board 2. A tape measure 13 affixed to the top plate 5 provides the ability to measure the height of the patient.

When the apparatus 1 is in use, a patient is immobilized on the top plate 5 by straps through apertures 19. The weight of the patient is determined by the load cells 6 and signals are transmitted electronically to the logic circuit on the circuit board 7, which processes the signals and then sends a 'switch on' signal to one of the lights 20-29 in each light bank 10. If the patient requires emergency medical care, time is of the essence and the emergency responder must be able to quickly retrieve the correct emergency package from the stores associated with the apparatus. While the visual display provides a numerical display of the weight, the emergency responder may not be close enough to that display when the emergency happens to be able to read the weight. Even if the emergency responder is close enough to read that display, it would be necessary to take time to mentally translate that weight into a decision as to what emergency package to use. However, since the light banks 10 are located around the periphery of the spine board 2, the colored lights 20-29 are readily visible requiring very little time to see and register. Further, the colors of the colored lights 20-29 already correspond to the standard colors marked on the emergency packages enabling the emergency responder to immediately recognize the correct package based on the matching of the colors of the illuminated light and the package, both of which are correlated to the weight of the patient.

FIG. 2A, FIG. 2B, FIG. 2C, FIG. 2D, FIG. 2E, FIG. 2F and FIG. 2G depict another embodiment of an apparatus 100 in accordance with the present invention. The apparatus 100 comprises a spine board 102, the spine board 102 comprising a bottom base portion 103 nested inside a matching top patient support portion 105. Three longitudinal ribs 130 extend longitudinally along and are secured on an inside face of the top patient support portion 105 to provide structural support for the top patient support portion 105. The longitudinal ribs 130 are generally parallel and are further secured together by first transverse braces 131 between the longitudinal ribs 130. The longitudinal ribs 130 bound two longitudinal channels 132a,b between a center rib and each of the two outside ribs. Six load cell plates 108 are secured on the inside face of the top patient support portion 105, three in one channel 132a and three in the other channel 132a between the ribs 130. The load cell plates 108 are spaced longitudinally within the channels 132a,b with two load cell plates proximate each end of the ribs 108, one in each channel, and two load cell plate proximate a middle of the ribs 108, one in each channel. The load cell plates 108 serve as contact points for six load cells 106 secured to an inside face of the bottom base portion 103. Further, two longitudinal braces 140a,b extend longitudinally along and are secured on an inside face of the bottom base portion 103. The longitudinal braces 140a,b are generally parallel and are transversely aligned with the channels 132a,b when the bottom base portion 103 is nested in the top patient support portion 105. The longitudinal braces 140a,b are further secured together by second transverse braces 141 between the longitudinal braces 140a,b. Six load cells 106 are secured on exposed faces of the longitudinal braces 140a,b and position so that the load cells 106 contact the load cell plates 108 when the bottom base portion 103 is nested in the top patient support portion 105. The entire weight of the top patient support portion 105 and anything resting on an outside surface of the top patient support portion 105 is supported entirely by the six load cells 106. While the bottom base portion 103 nests inside the top patient support portion 105, the top and bottom portions 103,105 are not secured together so that the top patient support portion 105 may move freely up and down on the bottom base portion 103 in order to permit the load cells 106 to correctly register the weight of anything resting on the outside surface of the top patient support portion 105 when the spine board 102 is in use.

The load cells 106 transmit electrical signals through wires 109 to a circuit board 107 having a logic circuit and a visual display 111 thereon. The visual display 111 displays a numerical output of weight measured by the load cells 106. The visual display 111 is covered by a membrane 114 to protect the display and an "on-off" button (not shown). The circuit board 107 is also electronically connected to a plurality of light clusters 110 (e.g. six) through wires (not shown). A battery power supply 118 secure to an inside face of the top patient support portion 105 is wired to the circuit board 107 and powers all of the electronics.

The light clusters 110 each comprise a plurality of colored LED lights 121-129 (e.g. nine, only one set labeled) located at a periphery of the outside face of the top patient support portion 105. The light cluster 110 with the nine colored LED lights 121-129 is labelled with a dotted circle for illustration purposes. The colored LED lights 121-129 in the light cluster 110 are color coded to correlate to the nine colors in the Broselow color scale. Therefore, each of the colored LED lights 121-129 corresponds to a particular weight range in accordance with the Broselow color scale. When the load cells 106 measure a weight, the logic circuit sends a 'switch on' signal to the appropriate colored light that corresponds to the weight range within which the measured weight falls. If the weight is removed or changed, the illuminated colored light receives a signal from the logic circuit to switch off, and another colored light may receive a signal to switch on. The plurality of light clusters 110 provide redundancy in the event a given light is broken, and also provides the ability for medical personnel to see lights from any vantage point. The nine colored LED lights 121-129 in a given light cluster 110 may be arranged in any suitable pattern, for example in a line, a 3×3 array, a circle, a square, etc., or any combination thereof. Four of the clusters 110 are shown as 3×3 arrays and two are shown as lines.

The bottom base portion 103 and the top patient support portion 105 comprise a plurality of apertures 119 (e.g. fourteen, only one labeled) distributed around the respective peripheries to act as hand holds to permit carrying of the apparatus 100 and also to provide apertures through which straps may be secured to immobilize a patient on the spine board 102. The two outside longitudinal ribs 130 also comprise matching apertures. When the bottom base portion 103 and the top patient support portion 105 are nested with the longitudinal ribs 130 therebetween, the fourteen matching apertures 119 on each of the bottom base portion 103, top patient support portion 105 and outside longitudinal ribs 130 are aligned to form fourteen apertures 119 on the spine board 102.

A tape 113 affixed to the outside surface of the top patient support portion 105 provides the ability to measure the height of the patient. The tape 113 may be marked in any suitable length unit (e.g. centimeters, inches, etc.) and/or color coded in accordance with the Broselow color scale. The tape 113 may be positioned on the outside surface of the top patient support portion 105 to run longitudinally proximate a centerline between the transverse edges of the spine board 102. The tape 113 may act as a redundancy for the colored LED lights 121-129 and display 111. However, more importantly, the tape 113 may be correlated to endotracheal tube size based on the length. The correlation may include using the Broselow color scale on the tape 113 so that an immediate indication of which color-coded package of medical equipment should be accessed for the endotracheal tube. The package containing the correct endotracheal tube may, in fact, be a different package than the one containing the correct medicament dosage or defibrillator for the particular patient. This is important because while medications and electricity provided in resuscitation are weight based (with the Broselow Tape being inaccurate) the endotracheal tube size is more dependent on length and does not change with weight of patient.

The apparatus of FIG. 2A-G was tested to determine whether patient weights could be accurately determined in a pediatric emergency department, and to compare the results to results obtained by estimating patient weights using a Broselow Tape.

In the test, the weights of 157 pediatric emergency patients were measured by a triage nurse in the usual manner using an infant weigh scale or a traditional standing medical weigh scale. The patient weights were also measured on the apparatus of the present invention. The patient weights were also estimated using a Broselow Tape with the estimate done using Palm PEDiLite™ app. The triage nurse would also take the patient's length using a measuring tape or height on the standing medical scale. Excluded from the test were critically ill patients, patients whose length was less than 46.1 cm, and non-English speaking patients having lengths greater than 146.6 cm. Consent for the test was obtained from the parent/guardian, and assent obtained for patients over 7 years of age.

Data was collected and entered into MedCalc™ for Windows™ 98, Version 15.2.2. Mean weights in kilograms (kg) were reported with 95% confidence intervals (CI). Continuous data were assessed for normal distribution using the D'Agostini-Pearson test. Standard Deviation (SD), Standard Error of the Mean (SEM), Median, Minimum and Maximum were determined from the D'Agostini-Pearson test. These results are shown in Table 1. It is evident from Table 1 that weights measured with the apparatus of the present invention were virtually identical to the weights measured using a clinical weigh scale in the pediatric emergency department. It is also evident that weights estimated using the Broselow Tape were significantly underestimated. Thus, the apparatus of the present invention provides a more reliable measurement of weight than the Broselow method.

TABLE 1

|  | Wt. Measured with Clinical Weigh Scale | Wt. Measure with Present Invention | Wt. Estimated with Broselow Tape |
|---|---|---|---|
| N | 157 | 157 | 157 |
| Mean (kg) | 19.4 | 19.4 | 16.9 |
| 95% CI | 17.4-21.3 | 17.4-21.3 | 15.6-18.2 |
| SD | 12.3 | 12.3 | 8.3 |
| SEM | 0.98 | 0.98 | 0.66 |
| Median (kg) | 15.0 | 15.1 | 15.0 |
| 95% CI | 14.1-17.4 | 14.1-17.5 | 13.0-16.0 |
| Minimum (kg) | 4.4 | 4.4 | 4.0 |
| Maximum (kg) | 78.4 | 78.7 | 36.0 |

Figure 3A:
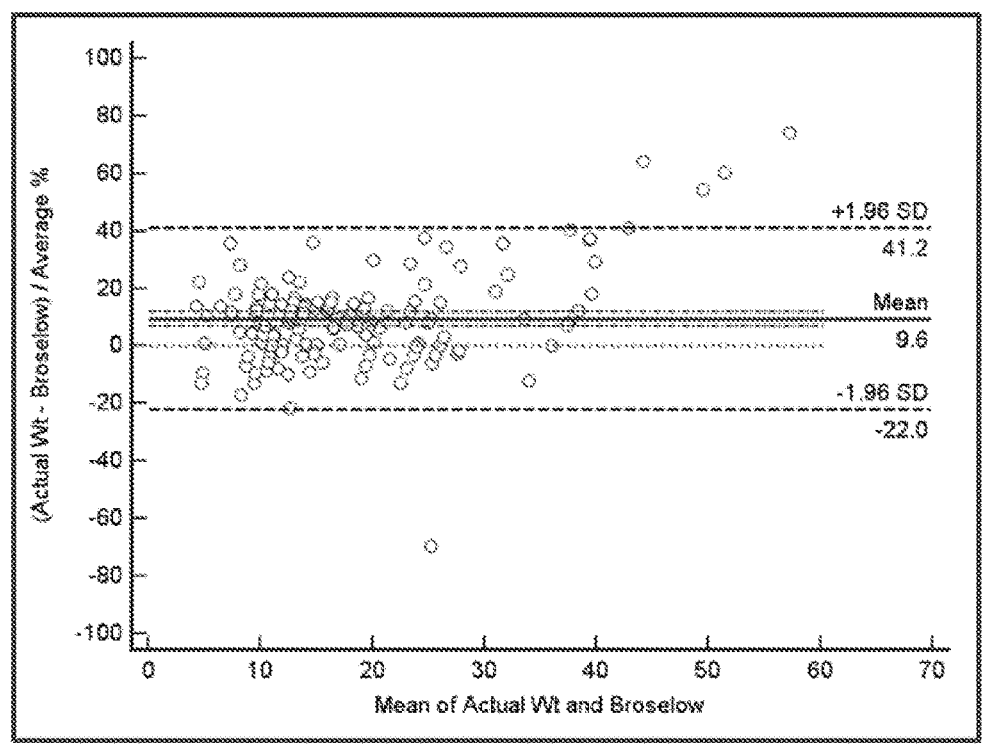
FIG. 3A depicts a Bland-Altman % differences graph of actual patient weight vs. patient weight estimated from a Broselow Tape; and, FIG. 3B depicts a Bland-Altman % differences graph of actual patient weight vs. patient weight measured by the apparatus of FIG. 2A (PedEBoard™).
Figure 3B:
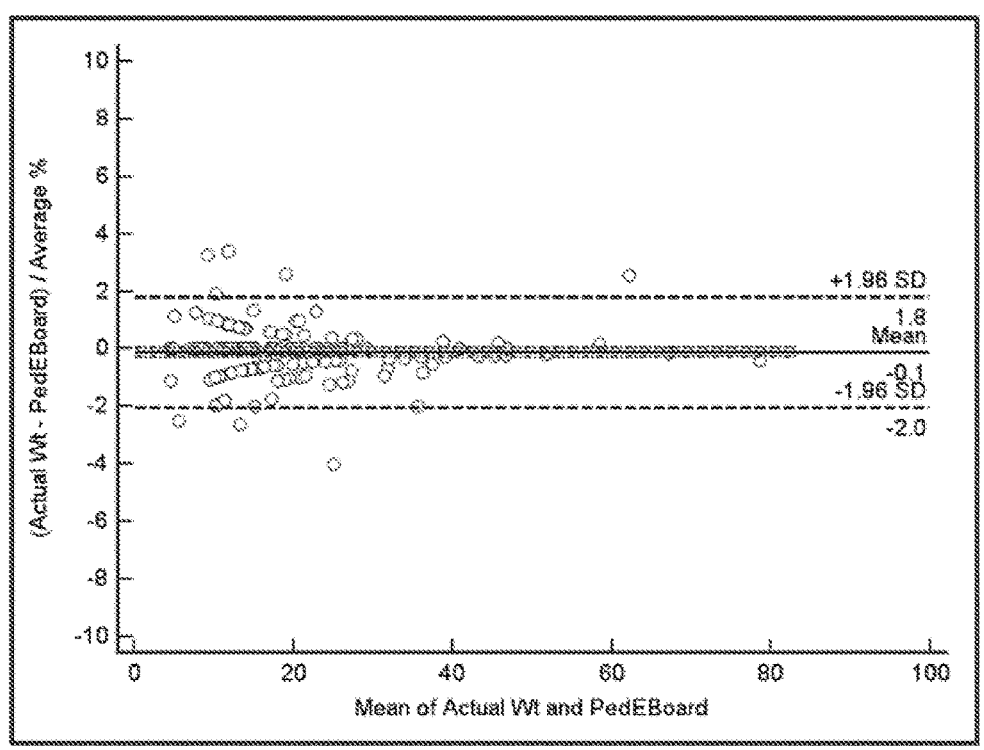

Bland-Altman analysis was also used to compare the percent difference between the actual weight measured with a clinical weigh scale and the Broselow-estimated weight (FIG. 3A) and the actual weight measured with a clinical weigh scale vs. the weight measured by the apparatus of the present invention (FIG. 3B). As seen in FIG. 3A, at the 95% confidence interval the percent difference is very wide (−22% to +41.2%) with the actual weight being 9.6% greater than the Broselow-estimate weight, and some of the actual differences are greater than 75%. As seen in FIG. 3B, there is at the 95% confidence interval the percent difference is much narrower (−2.0% to +1.8%) with a mean difference of 0.1% between the actual weight and the weight measured by the apparatus of the present invention, and none of the measurements are greater than 4% different.

The Spearman coefficient of rank correlation was also calculated. For the apparatus of the present invention, the Spearman coefficient of rank correlation is 1.000 with $p<0.0001$ (95% CI 0.999 to 1.000). For the Broselow tape, the Spearman coefficient of rank correlation is 0.969 with p<0.001 (95% CI 0.957 to 0.977).

It is evident from the above statistical analyses that the apparatus of the present invention provides a much more accurate patient weight than the weight estimated from the Broselow Tape.

Additionally, the number of patients which were placed in the wrong weight and color categories was determined for both the apparatus of the present invention and the Broselow Tape. Table 2 provides the results. It is evident from Table 2 that the apparatus of the present invention not only provides a more accurate weight than the weight estimated by the Broselow Tape, but also is much more successful at identifying the correct color category to permit proper selection of medicament dosages and defibrillation energies in an emergency care situation.

TABLE 2

|  | Present Invention | Broselow Tape |
| --- | --- | --- |
| Wrong Weight Category | 12 (8%) | 125 (80%) |
| Wrong Color Category | 12 (8%) | 72 (46%) |

Collectively the results illustrate that the Broselow Tape method is unable to accurately estimate the weight of pediatric patients, consistently underestimating the weight. This can lead to under-dosing patients with medication and using insufficiently charged defibrillation equipment, thereby putting patients' lives at risk. At the same time, certain treatment parameters are not weight-based, for example the size of endotracheal tubes, therefore the Broselow Tape method is still appropriate for selecting the proper endotracheal tube size. The present invention advantageously uncouples the historic Brosleow method to provide more accurate care to critically ill or injured children by providing an illuminated visual indication correlated to weight and therefore medicament dosage and defibrillation energy, while continuing to provide a measured length that correlates to endotracheal tube size. Further, despite the uncoupling of weight-based treatment options from length-based treatment options, the historic Broselow color markings on pre-packaged emergency medical equipment may still be utilized as the colored lights correspond to the correct colored package for the correct medicament dosage and defibrillation energy, while the length measurement using the Broselow Tape corresponds to a different, but still correct, colored package for the size of endotracheal tube. While this means that two packages may need to be opened for a single patient, there is no requirement for a complete changeover in current emergency pediatric procedures as the present invention may be seamlessly introduced into such procedures.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An apparatus comprising:
a backboard configured to support an immobilized, supine individual during transportation of the individual;
a weighing device associated with the backboard and moveable with the backboard during the transportation of the individual, the weighing device configured to determine weight of the individual on the backboard, the backboard further comprising a numerical display of the weight of the individual; and,
a light on the backboard, the light in electronic communication with the weighing device, the light associated with a predetermined weight range, the light configured to be illuminated only when the weight determined by the weighing device is within the predetermined weight range, the light configured to be visible by an emergency responder adjacent the backboard from a location where the numerical display of weight is not visible to the emergency responder.

2. The apparatus according to claim 1, wherein the light comprises a colored light.

3. The apparatus according to claim 1, wherein the light comprises a plurality of lights and each light of the plurality of lights corresponds to a different predetermined weight range.

4. The apparatus according to claim 3, wherein the lights are color-coded to correspond to a first color scale for determining a dosage of a medicament, the dosage correlated to the weight of the individual.

5. The apparatus according to claim 4, wherein the first color scale is a Broselow color scale.

6. The apparatus according to claim 4, wherein the backboard further comprises a height measuring device configured to measure height of the individual.

7. The apparatus according to claim 6, wherein the height measuring device is color-coded to correspond to a second color scale for determining a size of endotracheal tube for the individual, the size of endotracheal tube correlated to the height of the individual and the second color scale is a Broselow color scale.

8. The apparatus according to claim 1, wherein the light comprises one or more lights configured to display a plurality of colours, each colour corresponding to a different predetermined weight range and to a first colour scale for determining a dosage of a medicament, the dosage correlated to the weight of the individual.

9. The apparatus according to claim 1, wherein the light is separately located from the numerical display.

10. A system for selecting a dosage of a medicament for an individual on a backboard, the system comprising:
an apparatus as defined in claim 1; and,
a dosage form of a medicament containing a dosage of the medicament appropriate for an individual having a weight in the weight range being indicated by the illuminated light.

11. The system according to claim 10, wherein the dosage form comprises a marking correlated to the illuminated light.

12. The system according to claim 10, wherein the system further comprises a plurality of packages, each package comprising a dosage form containing a dosage of medicament appropriate for a given weight range,
wherein the light comprises a plurality of colored lights, each light of the plurality of lights corresponding to a different predetermined weight range,
and wherein the packages comprise colored markings, the colored markings corresponding to the same weight ranges to which the colored lights correspond.

13. A method for determining a dosage of a medicament for an individual on a backboard, the method comprising:
weighing the individual on the backboard with a weighing device associated with the backboard to determine a weight of the individual; and,
illuminating one or more lights on the backboard in electronic communication with the weighing device, the lights configured to display a plurality of colours, each colour corresponding to a different predetermined weight range and to a first colour scale for determining a dosage of a medicament, the dosage correlated to the weight of the individual.

14. The method according to claim 13, wherein the first color scale is a Broselow color scale.

15. The method according to claim 13, further comprising selecting a package containing the dosage of the medicament corresponding to the color of the illuminated light.

16. The method according to claim 13, further comprising determining a size of endotracheal tube for the individual and selecting a package containing the endotracheal tube of the size for the individual.

17. The method according to claim 16, wherein the size of endotracheal tube is determined from the height of the individual.

18. The method according to claim 17, wherein the height of the individual is determined with a height measuring device color-coded to correspond to a second color scale for determining the size of endotracheal tube based on the height and the second color scale is a Broselow color scale.

19. The method according to claim 13, wherein the individual is a pediatric patient.

20. The method according to claim 13, wherein the backboard further comprises a numerical display of the weight of the individual and wherein the one or more lights is configured to be visible by an emergency responder adjacent the backboard from a location where the numerical display of weight is not visible to the emergency responder.

* * * * *